United States Patent Office 2,810,734
Patented Oct. 22, 1957

2,810,734

11-KETO STEROID INTERMEDIATES AND PROCESS FOR MANUFACTURING SAME

Hershel Herzog, Rutherford, and Emanuel B. Hershberg, West Orange, N. J., and Stephen B. Coan, Brooklyn, N. Y., assignors to Schering Corporation, Bloomfield, N. J., a corporation of New Jersey No Drawing. Application May 21, 1951,
Serial No. 227,531

18 Claims. (Cl. 260—397.45)

The present invention relates to the manufacture of intermediates suitable for use in the synthesis of cortisone and related cortical steroids.

The invention relates in particular to the preparation of steroids of the general formula

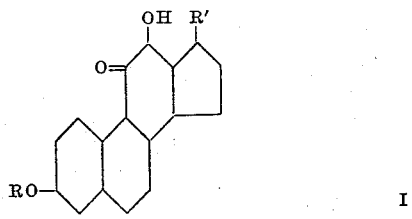

and to their conversion into the corresponding 12-halogen, preferably the 12-bromo derivatives. In the formula RO represents a hydroxyl or a group replaceable by hydroxyl with the aid of hydrolysis, such as alkoxy or aryloxy, like methoxy, ethoxy, benzoxy, etc., but is preferably the residue or radical of a monobasic or polybasic aliphatic or aromatic acid, such as acetoxy, succinoxy, benzoyloxy, phthalyloxy and other acyloxy or aroyloxy groups (the ester being a half-ester in the case of the dibasic acids), while R' is the unsaturated residue of the dehydration of a carbinol obtained by reacting a 17-substituent containing a carboxyl group or an esterified carboxyl group, with an organo-metallic compound of the Grignard type (e. g. Grignard reagents themselves, lithium-organo compounds, etc.) the organic radical being one which will not alter the course of dehydration of the resulting carbinol, R' being preferably the group —CH(CH$_3$)CH$_2$CH=C(Z)$_2$, wherein Z is a hydrocarbon or substituted hydrocarbon radical, such as lower aliphatic hydrocarbon radicals like ethinyl, t-butyl, and amyl, and phenyl radicals including unsubstituted phenyl, p-chlorophenyl, p-tolyl, etc., certain compounds wherein Z is attached at the 24-position through a tertiary carbon being particularly suitable for the preparation of cortisone.

It is the general object of the invention to provide an improved procedure whereby certain intermediates which can be employed in the synthesis of cortisone and related cortical steroids can be manufactured in an improved yield in a fewer number of steps than by the classical cortisone synthesis.

More specifically, it is an object of the invention to provide an improved process for the preparation of 11-keto steroids from 12-keto steroids and conversion of the 11 - keto compound to the 3 - acyloxy - 24, 24 - diphenylcholene-23 or analogous derivative in only 5 steps instead of the 9 steps previously required for the same starting compounds, whereby the over-all yield for the sequence is greatly improved without altering the nature of the end product, so that the remainder of the cortisone synthesis can be applied without further modification.

It is a still further object of the invention to provide a simplified process leading to the production of the 12-halo derivatives of Compound I whereby isolation in good yield is made possible.

It is also an object of the invention to provide new and valuable 11-keto steroids suitable for the manufacture of steroid compounds of physiological activity, including cortisone and related cortical hormones, as will be described more fully hereinafter.

The invention relates in general to the conversion of 3 - hydroxy - 12 - ketocholanic acid, and the analogous 17-steroid carboxylic acids having a degraded side chain, into the corresponding 3,12 - dihydroxy - 11 - ketocholanic acids, or their esters (of the carboxyl group), which are then treated with an organo-metallic compound of the Grignard type, and the carbinols thus obtained dehydrated and 3 - acylated in two steps, or simultaneously dehydrated and 3-acylated, or simultaneously dehydrated and 3,12-diacylated, by the use of the appropriate conditions. The 3-acylated product is then reacted with a halogenating agent to produce the 12-halo compound. The organic radical of the Grignard reagent or other organo-metallic compound is one that will not change the course of the dehydration of the carbinol, and for this reason organic radicals attached at the 24-position through tertiary carbons are preferred. Among these may be mentioned t-butyl and aryl radicals which may or may not be substituted by halogen or other groups. The 12-halogenated, and especially the 12-bromo, compounds can be readily separated in good yield and with a high degree of purity from the reaction mass.

While the invention is of broader application, as indicated above, it will be further described, for the sake of simplicity, in connection with the conversion of desoxycholic acid into its derivatives corresponding to Formula I hereinabove, wherein the 12-hydroxyl is replaced by halogen, particularly bromine, as such derivatives can be used directly for the next stages in the manufacture of cortisone and related cortical hormones.

The invention relates especially to the reaction of a steroid of the general Formula II, where R" is H, aliphatic acyl or aroyl, R''' is H, aliphatic acyl or aroyl, and R$^{IV}$ is H, alkyl or aryl, with a compound of the Grignard type, such as a Grignard reagent ZMgX, or the corresponding lithium compound ZLi, where Z is a lower aliphatic hydrocarbon or aryl group, for example ethinyl, t-butyl, phenyl, p-tolyl, or p-chlorophenyl, and X is halogen, to give a 3,12-dihydroxy-11-keto-24,24-diaryl (or dialkyl) cholan-24-ol (III), which is then heated with a carboxylic acid and/or carboxylic acid anhydride (such as acetic acid or acetic anhydride, or an aromatic acid, if necessary, in an inert solvent) to yield the 3-aliphatic acyloxy (or aroyloxy)-12-hydroxy- 11 - keto - 24, 24 - diaryl (or dialkyl) chol - 23 - ene (I), as indicated by the following equations:

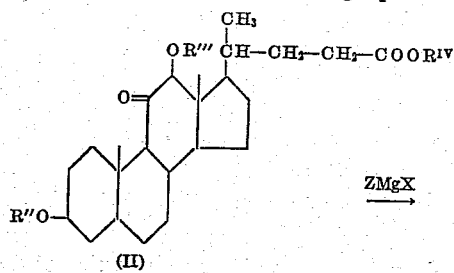

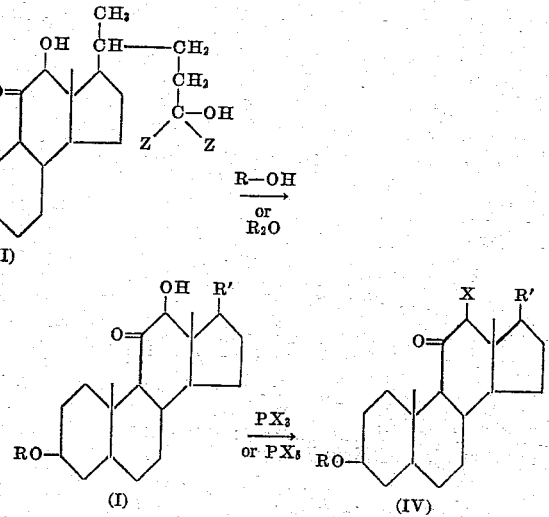

wherein R' is as defined hereinabove. If it is desired to isolate the unacylated steroid this may be accomplished by dehydrating the carbinol III under milder conditions, for example, by brief warming with a carboxylic acid or a mineral acid. If it is desired to obtain the 3,12-diacetate this may be accomplished by dehydrating carbinol III under the most vigorous conditions, for example by prolonged reflux with excess carboxylic acid anhydride. The 3,12 - dihydroxy - 11-keto-24,24-diaryl (or dialkyl) chol-23-ene may then be selectively acylated by heating with a carboxylic acid or carboxylic acid anhydride to yield I. Compound I is then converted to the corresponding 12-halo-11-ketosteroid IV by treatment with a halogenating agent, such as a phosphorus halide, for example, phosphorus tribromide, a thionyl halide, for example thionyl chloride, a phosphorus oxyhalide, for example phosphorus oxycloride, or a halogen acid, for example hydrogen bromide.

Steroids of the type I represent important intermediates in the synthesis of cortisone and related cortical steroids. The process described presents a novel method of converting 3,12-dihydroxy-11-ketocholanic acid (Marker-Lawson acid), which is readily prepared from desoxycholic acid (Gallagher, J. B. C. 162, 539 (1946)), to a 12 halo-11-ketosteroid (IV), for example 3-acetoxy-12-bromo-11-keto-24,24-diphenylchol-23-ene, identical with or closely analogous to the diphenylcholene intermediates described by Kendall (U. S. Patent No. 2,541,074), in the classical cortisone synthesis.

The complete process of the present invention which comprises the conversion of desoxycholic acid into compounds I and IV includes an improved procedure for obtaining the intermediate Marker-Lawson acid, so that the whole process beginning with the 3-acyloxy derivative of desoxycholic acid and ending with Compound IV involves as above stated, only five steps leading to the production of Compound IV.

According to our process, following the introduction of halogen into the 11-position in, for example, a 3-acyloxy-12-keto cholanic (or degraded cholanic) acid compound, the halogen is replaced by hydroxyl and interchange of the 11-hydroxyl and 12-keto groups effected in one step by heating with alcoholic alkali, after which the carboxyl group may be esterified, the ester or acid reacted with a Grignard type of compound, and the so-obtained carbinol then simultaneously dehydrated and esterified in the 3-position by heating with a carboxylic acid and/or its anhydride, after which the 3-acyloxy-11-keto-12-hydroxy-24,24-diaryl or dialkyl cholene-23 is treated with a halogenating agent to produce the 12-halogen derivative. Known processes wherein 3,12-dihydroxy-11-ketocholanic acid is first halogenated in the 12-position and then treated to replace the halogen with hydrogen (Gallagher, U. S. Patent No. 2,447,325, issued August 17, 1948) can only lead to an 11-keto cholane which possesses no 12-halo substituent or, in fact, any 12-substituent. Even if the 12-halo compound were Grignardized (without prior replacement of the halogen with hydrogen) a product having no 12-substituent would be obtained because the 12-halo substituent would be replaced by hydrogen during the Grignard reaction necessary to produce the diarylcholene-type side chain (U. S. Patent 2,541,074). This elimination of the 12-halo group, however, is undesirable, for it has been found that the 12-halo substituent greatly facilitates the subsequent side-chain degradation necessary for the preparation of cortical steroids, leading to compounds whose physical properties lend them to ready isolation.

As already indicated, the process of the invention is based in part on the discovery that the steroid carbinols (III) can be simultaneously dehydrated and selectively acylated (with aliphatic or aromatic acid groups) at the 3-position in high yield by heating with either a carboxylic acid and/or a carboxylic acid anhydride. The esterification at the 3-position is necessary in order that the replacement of the 12-hydroxyl group by halogen may be accomplished selectively. The steroid carbinols (III) represent a new group of compounds whose unique properties allow the simultaneous dehydration and selective esterification to be performed efficiently.

The replacement of the 12-hydroxyl group by halogen in steroids of Type I is best accomplished by adding a thionyl or phosphorus halide to a cold solution of the steroid in an inert solvent, such as methylene chloride, chloroform or benzene. Where R' includes a free carboxyl group or hydroxyl group, steroid I should be esterified or acylated prior to the replacement of the 12-hydroxyl group.

The Marker-Lawson acid is prepared by an improved procedure over that described by Gallagher. The 3-acyloxy, preferably the 3-succinoxy, derivative of desoxychloic acid is brominated with bromine in hot acetic acid solution and the resulting bromide is then converted directly to the Marker-Lawson acid in one step by refluxing with alcoholic sodium or potassium hydroxide and acidifying. A yield superior to any previously described is obtained by repeated treatment of the crystallization mother liquors with alkali, followed by isolation of additional Marker-Lawson acid after each pass.

The several steps included in our improved process are set out in greater detail in the following example which is presented for purposes of illustration only and not as indicating the limits of the invention. All temperatures are in degrees centigrade.

EXAMPLE

1. 3(α)-succinoxy-11-bromo-12-ketocholanic acid 500 grams of 3(α)-succinoxy-12-ketocholanic acid (U. S. Patent No. 2,445,006) were dissolved in 7 liters of acetic acid by warming to 70° with stirring. The solution temperature was then lowered to 60° and a solution of 168 g. of bromine in 500 cc. of acetic acid was added, with stirring, at such a rate that addition was complete in 2–3 hours. Stirring was continued for one hour while maintaining the solution temperature at 50–60°. At the end of this period, 22 liters of ice-water were added slowly with stirring and the resultant precipitate was filtered and washed thoroughly with water; yield, 580 g. of 3(α)-succinoxy-11-bromo-12-ketocholanic acid, M. P. 178–180°, $(α)^{25}+46°$ (1% solution in 95% ethanol).

2. 3(α),12(β)-dihydroxy-11-ketocholanic acid

The bromoketone obtained in Step 1 was dissolved in 5 liters of methanol. A solution of 1.0 kg. of sodium hydroxide in 5.0 liters of water was added and the resultant solution was refluxed in a nitrogen atmosphere for 1–2 hours. The alkaline solution was poured into 1.5 kg. of sulfuric acid in mixture with 25 kg. of ice, the resultant precipitate was filtered, washed with water and dried; yield 413 g., M. P. 179–181°. The crude acid was slurried in 830 ml. of boiling ethyl acetate, cooled to 20° and filtered, to yield 346 g. of crystalline solid, M. P. 185.4–191.8°. The dried solid was recrystallized from 2.5 liters of isopropanol to yield 190 g. of crystalline solid, M. P. 199.4–200.6. The mother liquors from the above purification were combined, evaporated, and the residues retreated with alkali as described above. From the recycle there was obtained 138 g. of crystalline solid, M. P. 196–198°.

3. Methyl 3(α)-12(β)-dihydroxy-11-ketocholanate 190 grams of 3(α)-12(β)-dihydroxy-11-ketocholanic acid (Marker-Lawson acid) were suspended in 570 cc. of methanol, 10 cc. of acetyl chloride were added, and the mixture was refluxed one hour. The resulting solution was allowed to stand overnight and the solid which precipitated was filtered; yield 177 g. of methyl 3(α)-12(β)-dihydroxy-11-ketocholanate, M. P. 154–155°. An additional 10 g. of the ester, M. P. 152–153° were obtained by concentrating the mother liquors.

4. 3(α)-acetoxy-11-keto-12-hydroxy-24,24-diphenylchol-23-ene

To the Grignard reagent prepared from 58.2 g. of magnesium, 276 cc. of bromobenzene, and 900 cc. of anhydrous ether there were added, with stirring, a warm solution of 126 g. of the methyl ester from step 3 in 1.2 liters of dry toluene. The ether was distilled simultaneously with the addition of the ester, the mixture was heated to 90° for two hours, cooled and decomposed by the addition of 1 liter of 30% acetic acid. The mixture was then steam distilled until the removal of biphenyl was complete, and the residual oils were then taken up in ether. Evaporation of the dry ethereal solution yielded an oil, which was then refluxed in 1 liter of acetic acid (or 750 cc. acetic acid and 30 cc. acetic anhydride) for eight hours. The acetic acid solution was poured into 3 liters of ice water and the precipitated solids were filtered and dried at 100° to yield an oil which solidified on cooling. Recrystallization of the residue from 1.5 liters of acetonitrile yielded 3(α)-acetoxy-11-keto-12-hydroxy-24,24-diphenylchol-23-ene, M. P. 165–168°.

5. 3(α),12(β)-dihydroxy-11-keto-24,24-dihpenylchol-23-ene

The procedure described in Step 4 was followed with the following modifications. Instead of refluxing the acetic acid solution of the oil from the Grignard reaction for eight hours, the solution was merely heated to boiling and allowed to cool. The resulting solution was diluted with 5 liters of water and the precipitate was removed by filtration. Recrystallization from methanol gave 3(α),12(β)-dihydroxy-11-keto-24,24-diphenylchol-23-ene, a crystalline solid, M. P. 117.5–119.5°.

6. 3(α),12(β)-diacetoxy-11-keto-24,24-diphenylchol-23-ene

The procedure described in Step 4 was followed with the following further modifications. Instead of taking up the oil from the Grignard reaction in 1 liter of acetic acid, it was taken up in 500 cc. of acetic anhydride and the resulting solution was refluxed for 8 hours. On cooling and standing, the solution deposited crystalline 3(α),12(β) - diacetoxy - 11 - keto - 24,24 - diphenylchol-23-ene, M. P. 180–181°.

7. 3(α)-acetoxy-11-keto-12-bromo-24,24-diphenylchol-23-ene 5 grams of the product from Step 4 were dissolved in 20 cc. of anhydrous methylene chloride, the solution was cooled to 0° and 1.15 cc. of distilled phosphorus tribromide were added slowly. The reaction mixture was stored for eighteen hours at 25°. Ice water was then added to decompose the excess phosphorus tribromide, the methylene chloride solution was washed with water, dried, concentrated in vacuo, and the residue was crystallized from acetic anhydride to yield 3(α)-acetoxy-11-keto-12-bromo-24,24-diphenylchol-23-ene, M. P. 173–175°.

8. 3(α)-acetoxy-11-keto-12-bromo-23,23-diphenylnorchol-22-ene

By application of the process embodied in Steps 1, 2, 3, 4 and 7, 3(α)-succinoxy-12-ketonorcholanic acid was converted to the crystalline solid, 3(α)-acetoxy-11-keto-12-bromo-23,23-diphenylnorchol-22-ene.

9. 3(α)-acetoxy-11-keto-12-bromo-22,22-diphenylbisnorchol-$\Delta^{20,22}$-ene By application of the process embodied in Steps 1, 2, 3, 4 and 7, 3(α)-succinoxy-12-ketobisnorcholanic acid was converted to the crystalline solid, 3(α)-acetoxy-11-keto-12-brom-22,22-diphenylbisnorchol-$\Delta^{20,22}$-ene.

10. 3(α)-acetoxy-11-keto-12-bromo-17-benzhydrylideneetiocholane

By application of the process embodied in Steps 1, 2, 3, 4 and 7, 3(α)succinoxy-12-ketoetiocholanic acid was converted to the crystalline solid, 3(α)-acetoxy-11-keto-12-bromo-17-benzhydrylideneetiocholane.

11. 3(α)-acetoxy-12-bromoetiocholane-11,17-dione and 3(α)-acetoxy-12-bromopregnane-11,20-dione To a solution of 3.87 g. of the product from Step 7 in 50 cc. of ethylene dichloride and 60 cc. of acetic acid was added a solution of 10 cc. of sulfuric acid, 10 cc. of water and 20 cc. of acetic acid. The reaction mixture was cooled to 0–5° and a cold solution of 12.3 g. of chromium trioxide in 8 cc. of water and 10 cc. of acetic acid was added rapidly. After the mixture had been stirred for one hour it was diluted with 5 volumes of water and 20 cc. of methanol were added. The aqueous layer was separated and the ethylene dichloride layer was washed free of acidic materials with dilute alkali. The resulting ethylene dichloride solution was concentrated and the residues treated with excess semicarbazide hydrochloride and sodium acetate in methanol solution under reflux. The precipitated semicarbazones were separated and the parent ketones regenerated by acid hydrolysis. From the resulting mixture were isolated by fractional crystallization, two crystalline solids, 3(α) - acetoxy - 12 - bromoetiocholane-11,17-dione and 3(α)-acetoxy-12-bromopregnane-11,20-dione.

In Step 3, other acidic catalysts than acetyl chloride can be employed in the esterification, such as sulfuric acid, and other catalysts well known in the art. The esterification can also be effected with other agents than methanol, for example, diazomethane. It is within the scope of the invention to produce other esters than the methyl ester, including aryl esters, but those of the lower aliphatic alcohols are preferred.

In Steps 4 and 6 other organic carboxylic acids and their anhydrides can also be employed to form the corresponding 3-esters and 3,12-diesters.

Compound IV disclosed hereinabove can, after hydrolysis, be selectively oxidized, as with chromic acid, to produce the corresponding 3-keto compound.

As illustrated by Step 11, the product of Step 7 can be subjected in various known ways to the action of an oxidizing agent to effect at least partial degradation of the 17-side chain, such oxidation leaving, as a residue, ketonic oxygen, the group —CO—CH₃, or any group having less than 5 carbon atoms, at the 17-position.

We claim:

1. The process which comprises reacting a member of the class consisting of 3,12-dihydroxy-11-keto steroids having at the 17-position a carboxyl-containing group, and their esters, with an organo-metallic compound of the Grignard type, and heating the resulting carbinol with an organic carboxylic acid for a period of time such that simultaneous dehydration of the carbinol compound and selective esterification of the 3-hydroxyl are effected.

2. Process according to claim 1 wherein the product is reacted with a halogenating agent to replace the 12-hydroxyl with halogen.

3. Process according to claim 1, wherein the organo-metallic compound is phenyl magnesium bromide.

4. Process according to claim 1, wherein the dehydrating and esterifying agent is acetic acid and the heating is conducted under reflux for about 8 hours.

5. Process for the manufacture of compounds of the formula:

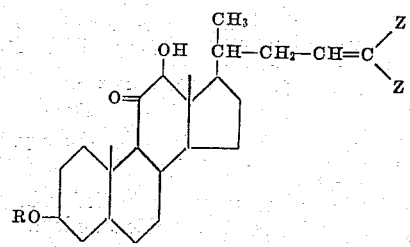

wherein R is the acyl group of an organic carboxylic acid, and Z is the organic radical of the after-mentioned organo-metallic compound, which comprises reacting an ester of the compound of the formula:

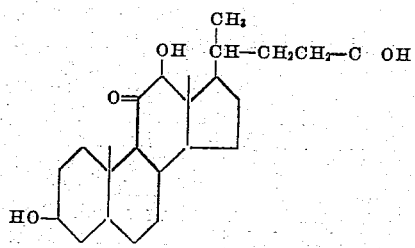

with an aryl magnesium halide and then heating the carbinol with a member of the group consisting of carboxylic organic acids and their anhydrides for a period of time such that dehydration and simultaneous acylation of the 3-hydroxyl are effected.

6. Process according to claim 5, wherein the aryl magnesium halide is phenyl magnesium bromide.

7. Process for the manufacture of compounds of the formula:

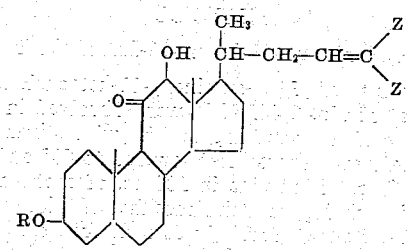

wherein R is the acyl group of an organic carboxylic acid, and Z is the organic radical of the after-mentioned organo-metallic compound, which comprises reacting an ester of the compound of the formula:

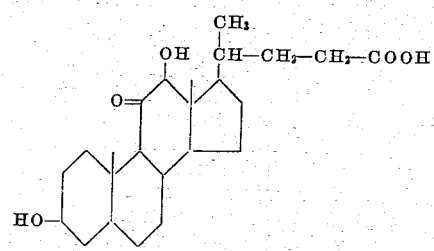

with an organo-metallic compound of the Grignard type, wherein the organic radical is a member of the group consisting of lower aliphatic hydrocarbon and phenyl radicals, heating the so-obtained carbinol with a member of the group consisting of carboxylic organic acids and their anhydrides for a period of time such that dehydration and simultaneous acylation of the 3-hydroxyl are effected, replacing the 12-hydroxy group with halogen by treating the product with a halogenating agent and isolating the 3(α)-acyloxy-11-keto-12-halo-24,24-disubstituted chol-23-ene.

8. Process for the manufacture of compounds of the formula

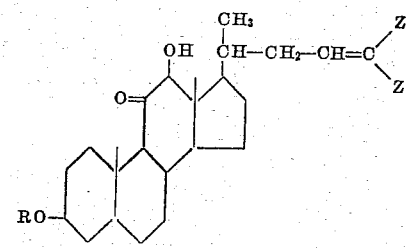

wherein R is the acyl group of an organic carboxylic acid, and Z is the organic radical of the after-mentioned organo-metallic compound, which comprises reacting an ester of the compound of the formula:

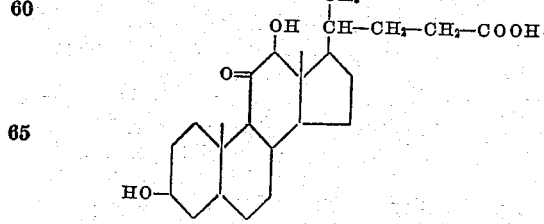

with an organo-metallic compound of the Grignard type, wherein the organic radical is a member of the group consisting of lower aliphatic hydrocarbon and phenyl radicals, and refluxing the so-obtained carbinol with acetic acid for a period of time such that dehydration and simultaneous acetylation of the 3-hydroxyl are effected.

9. The process which comprises reacting the compound of the formula

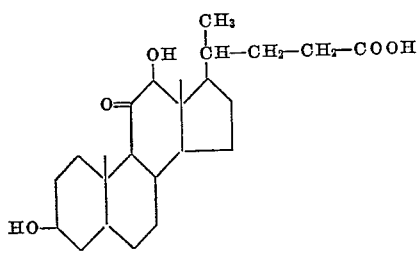

with methyl alcohol in the presence of an acidic catalyst to produce the methyl ester, treating the ester with phenyl magnesium bromide to produce the 24,24-diphenyl carbinol, and refluxing the carbinol with acetic acid for a period of time such that 3-acetoxy-11-keto-12-hydroxy-24,24-diphenyl-chol-23-ene is produced.

10. Process according to claim 9 including the step of reacting the product with phosphorus tri-bromide to produce the 12-bromo derivative.

11. Process according to claim 9 including the step of isolating the dehydrated and 3-acylated product and reacting the same with a halogenating agent to replace the 12-hydroxyl with halogen.

12. Process according to claim 11 wherein the isolated reaction product is reacted with an oxidizing agent to effect at least partial degradation of the 17-side chain and thereafter reacting the product with a reducing agent to effect the removal of the 12-halogen.

13. Process according to claim 9 including the steps of isolating the dehydrated and 3-acylated carbinol, reacting the same with a brominating agent to replace the 12-hydroxyl with bromine, reacting the product with an oxidizing agent to effect at least partial degradation of the 17-side chain, and thereafter removing the bromine by treatment with a reducing agent.

14. Process according to claim 9 wherein the carbinol is heated with a mixture of acetic acid and acetic anhydride.

15. A compound of the formula

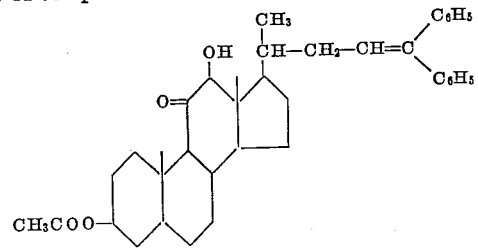

16. 3,11-diketo-12-hydroxy-24,24-diphenyl-chol-23-ene.
17. 3,12-dihydroxy-11-keto-24,24-diphenyl-chol-23-ene.
18. The diacetate of the compound of claim 17.

References Cited in the file of this patent

UNITED STATES PATENTS

| | | |
|---|---|---|
| 2,156,275 | Butenandt | May 2, 1939 |
| 2,263,785 | Reichstein | Nov. 25, 1941 |
| 2,447,325 | Gallagher | Aug. 17, 1948 |
| 2,541,074 | Kendall | Feb. 13, 1951 |